United States Patent
Ford

(10) Patent No.: US 9,213,084 B2
(45) Date of Patent: Dec. 15, 2015

(54) SITUATIONAL MARKING AND AWARENESS TAG (SMART) BEACON, SYSTEM AND METHOD

(75) Inventor: Timothy D. F. Ford, Beaconsfield (CA)

(73) Assignee: THE FLEWELLING FORD FAMILY TRUST, Beaconsfield (CA)

(*) Notice: Subject to any disclaimer, the term of this patent is extended or adjusted under 35 U.S.C. 154(b) by 218 days.

(21) Appl. No.: 13/404,549

(22) Filed: Feb. 24, 2012

(65) Prior Publication Data

US 2012/0218101 A1 Aug. 30, 2012

Related U.S. Application Data

(60) Provisional application No. 61/446,287, filed on Feb. 24, 2011, provisional application No. 61/446,290, filed on Feb. 24, 2011, provisional application No. 61/486,967, filed on May 17, 2011.

(51) Int. Cl.
| | |
|---|---|
| G08B 1/08 | (2006.01) |
| G08B 5/22 | (2006.01) |
| G01S 5/16 | (2006.01) |
| G01S 1/70 | (2006.01) |
| G01S 19/48 | (2010.01) |
| G01S 19/49 | (2010.01) |

(52) U.S. Cl.
CPC ... *G01S 5/16* (2013.01); *G01S 1/70* (2013.01); *G08B 5/22* (2013.01); *G01S 19/48* (2013.01); *G01S 19/49* (2013.01)

(58) Field of Classification Search
USPC ............ 340/2.24, 6.1, 12.1–12.55, 331, 332, 340/539.1–539.32, 642, 907–909, 947, 953, 340/954, 983, 985; 244/114 R; 315/130, 315/133; 362/103–108, 555; 455/328, 336, 455/338, 345, 350, 502
See application file for complete search history.

(56) References Cited

U.S. PATENT DOCUMENTS

| | | | |
|---|---|---|---|
| 3,787,867 A * | 1/1974 | Dodge et al. .................. | 340/985 |
| 4,354,172 A | 10/1982 | Takeyasu et al. | |
| 4,590,471 A | 5/1986 | Pieroway et al. | |
| 4,754,416 A * | 6/1988 | Adams et al. ................. | 340/985 |
| 4,951,046 A | 8/1990 | Lambert et al. | |
| 5,969,642 A | 10/1999 | Runyon et al. | |
| 6,545,606 B2 * | 4/2003 | Piri et al. .................... | 340/573.1 |
| 6,929,378 B2 * | 8/2005 | Wang .......................... | 362/153.1 |
| 7,076,261 B2 | 7/2006 | Austman et al. | |
| 7,359,647 B1 * | 4/2008 | Faria et al. .................... | 398/171 |
| 7,456,754 B1 * | 11/2008 | Haynes et al. ............. | 340/815.4 |

(Continued)

FOREIGN PATENT DOCUMENTS

| | | | | |
|---|---|---|---|---|
| CA | 2007978 | 7/1990 | | |
| EP | 2131630 A2 * | 12/2009 | ............ | H05B 37/03 |
| EP | 2199206 A1 | 6/2010 | | |

OTHER PUBLICATIONS

International Search Report of PCT/CA2012/050112, mailed Jun. 6, 2012.

*Primary Examiner* — Benjamin C Lee
*Assistant Examiner* — Stephen Burgdorf
(74) *Attorney, Agent, or Firm* — Goudreau Gage Dubuc; Hugh Mansfield

(57) ABSTRACT

A system and method are disclosed comprising a plurality of small independent light sources which are arranged in a mesh network and capable of exchanging data such that they can be operated together and under control of a controller in order to provide enhanced lighting effects in particular applications.

10 Claims, 15 Drawing Sheets

(56) References Cited

U.S. PATENT DOCUMENTS

| | | |
|---|---|---|
| 2004/0021569 A1* | 2/2004 | Lepkofker et al. ......... 340/568.1 |
| 2004/0100396 A1* | 5/2004 | Antico et al. ................ 340/985 |
| 2004/0162059 A1* | 8/2004 | Hiltunen et al. .......... 455/412.1 |
| 2005/0003774 A1* | 1/2005 | Austman et al. ........... 455/151.2 |
| 2005/0253533 A1* | 11/2005 | Lys et al. ...................... 315/224 |
| 2006/0044152 A1 | 3/2006 | Wang |
| 2007/0222640 A1* | 9/2007 | Guelzow et al. ............. 340/908 |
| 2007/0273511 A1* | 11/2007 | Clary ............................ 340/565 |
| 2008/0155064 A1* | 6/2008 | Kosuge et al. ................ 709/219 |
| 2008/0211427 A1 | 9/2008 | Budde et al. |
| 2009/0047850 A1* | 2/2009 | Russell et al. .................. 441/89 |
| 2009/0224909 A1* | 9/2009 | Derrick et al. ........... 340/539.13 |
| 2009/0231159 A1* | 9/2009 | Selevan ........................ 340/907 |
| 2010/0327766 A1* | 12/2010 | Recker et al. ................. 315/291 |
| 2011/0121734 A1* | 5/2011 | Pape ............................... 315/86 |
| 2011/0181434 A1* | 7/2011 | Uhm .......................... 340/686.6 |
| 2012/0136485 A1* | 5/2012 | Weber et al. .................. 700/275 |

* cited by examiner

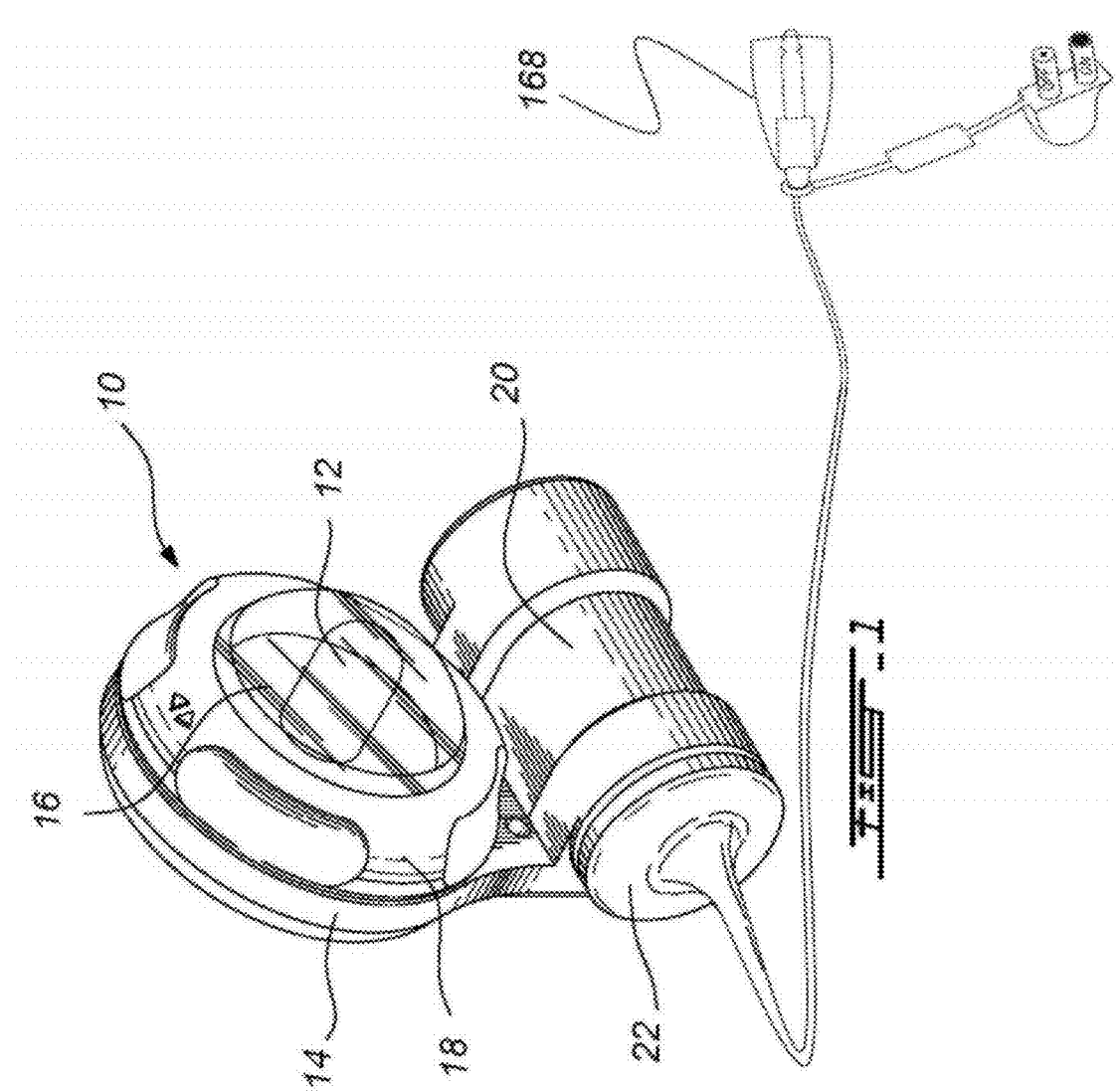

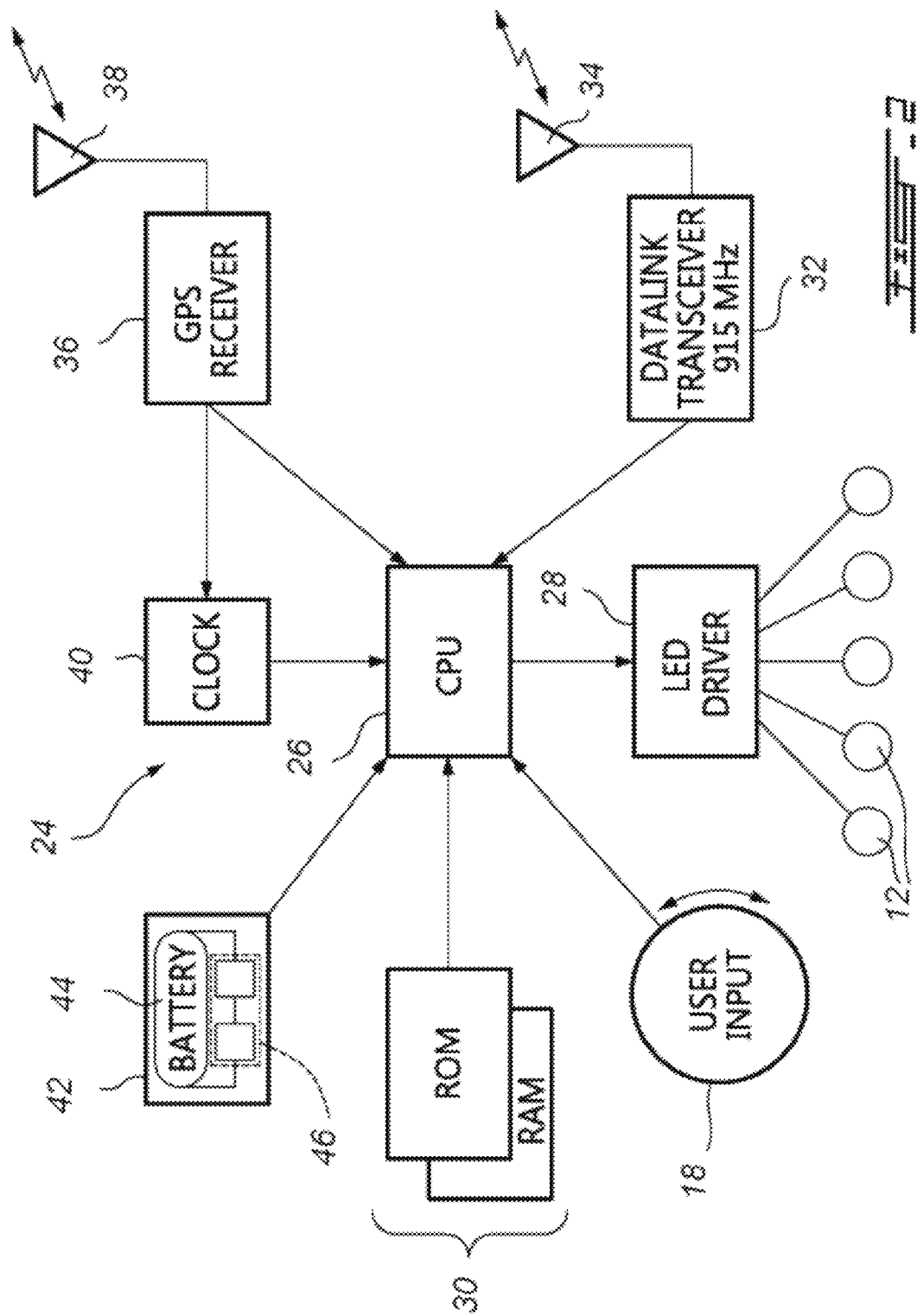

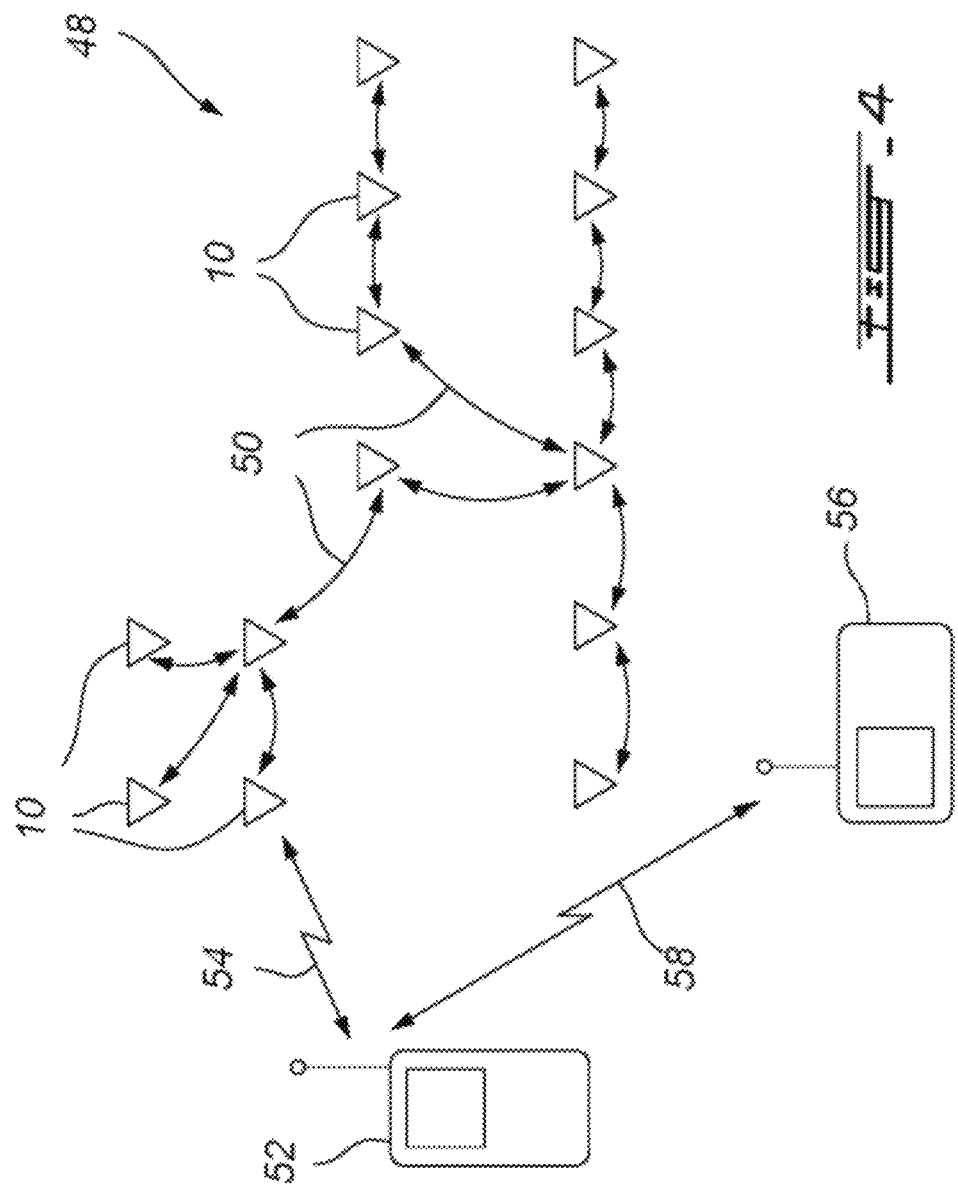

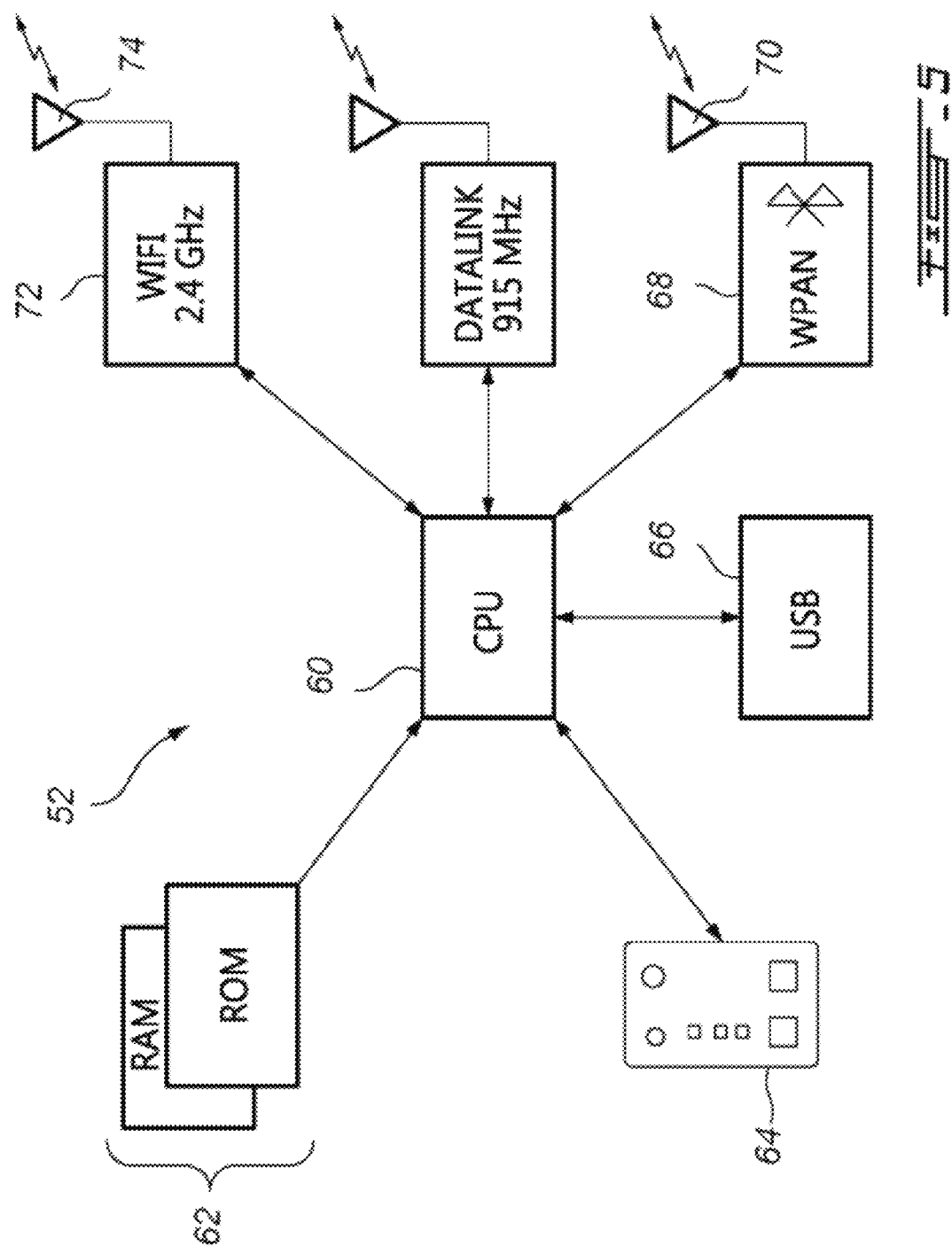

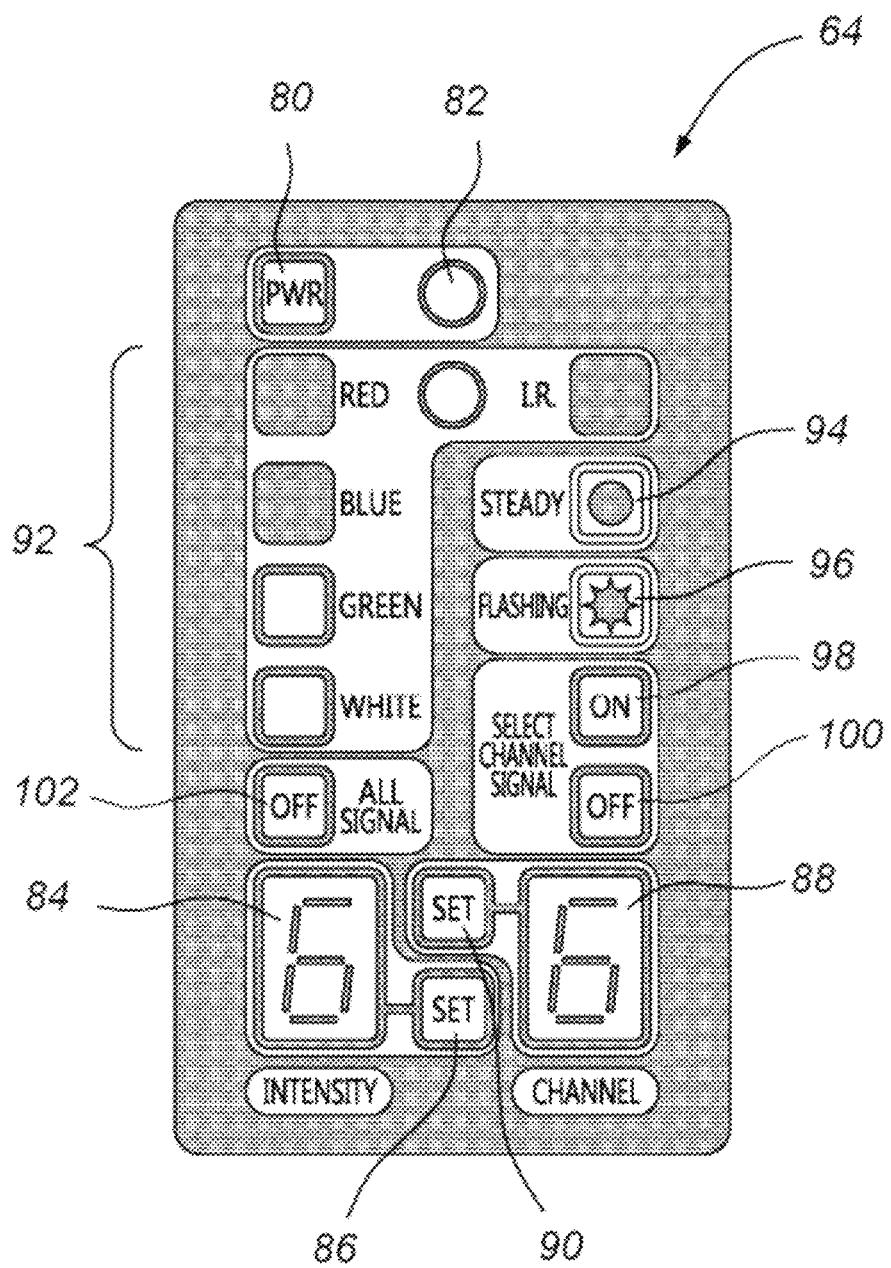

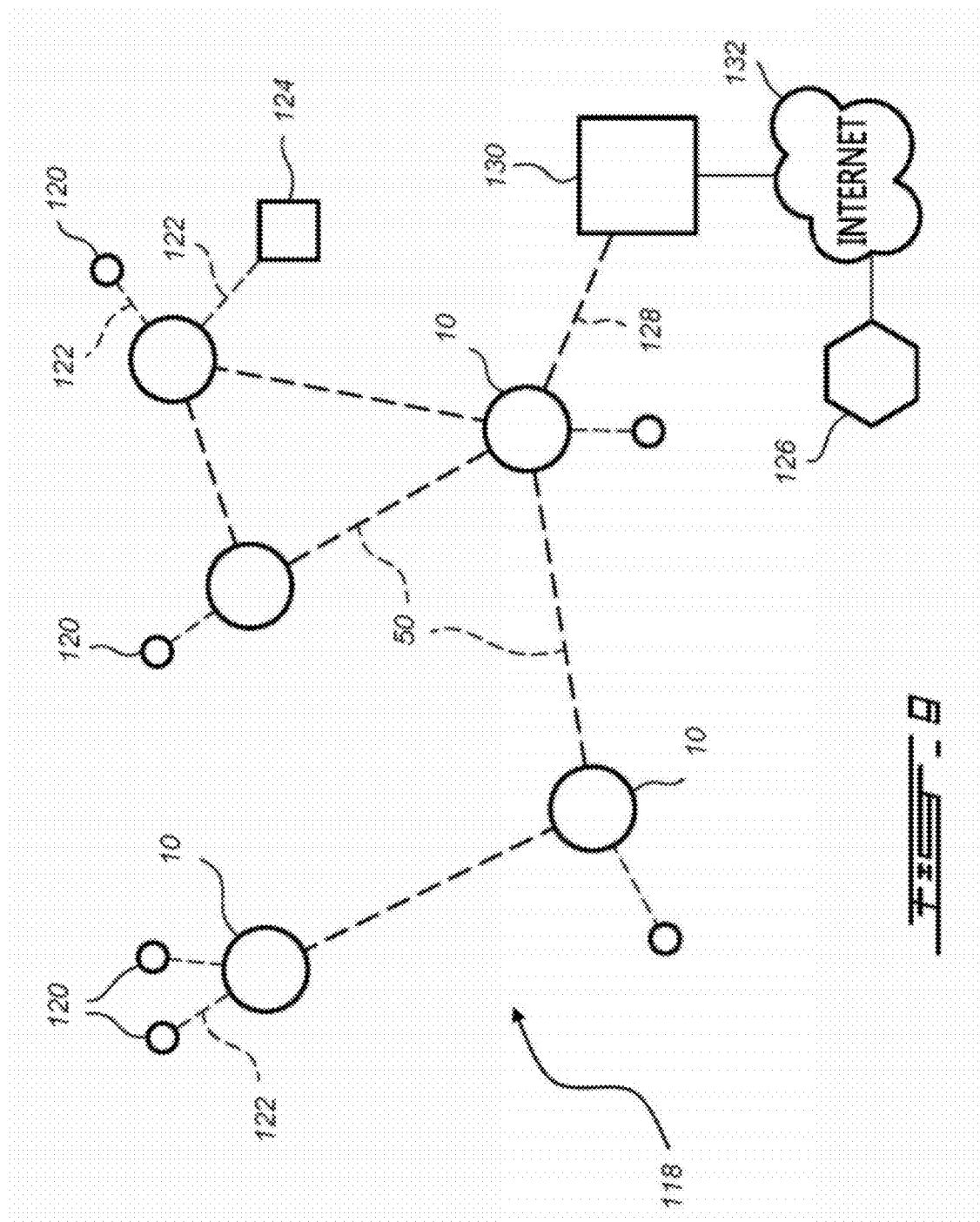

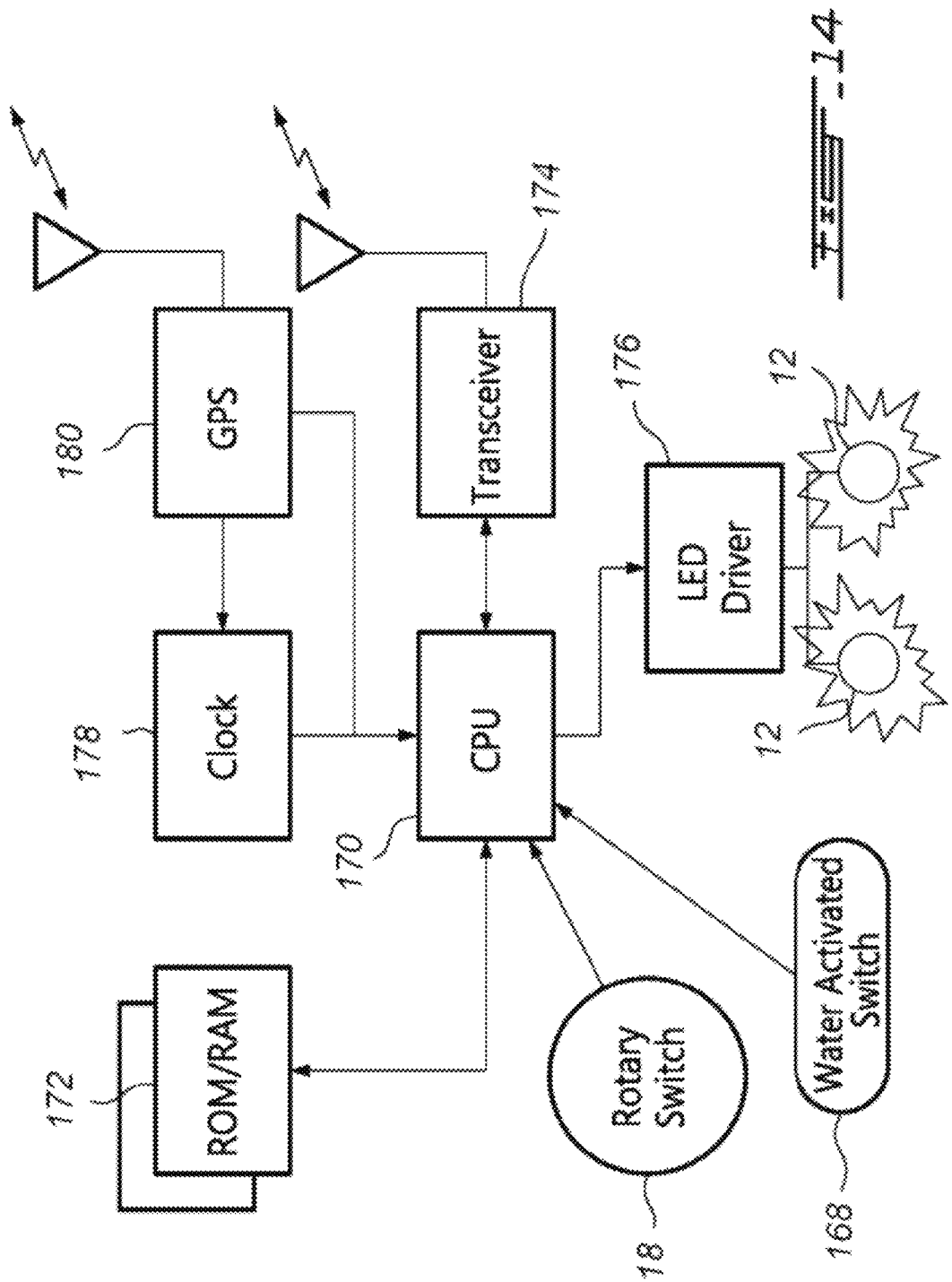

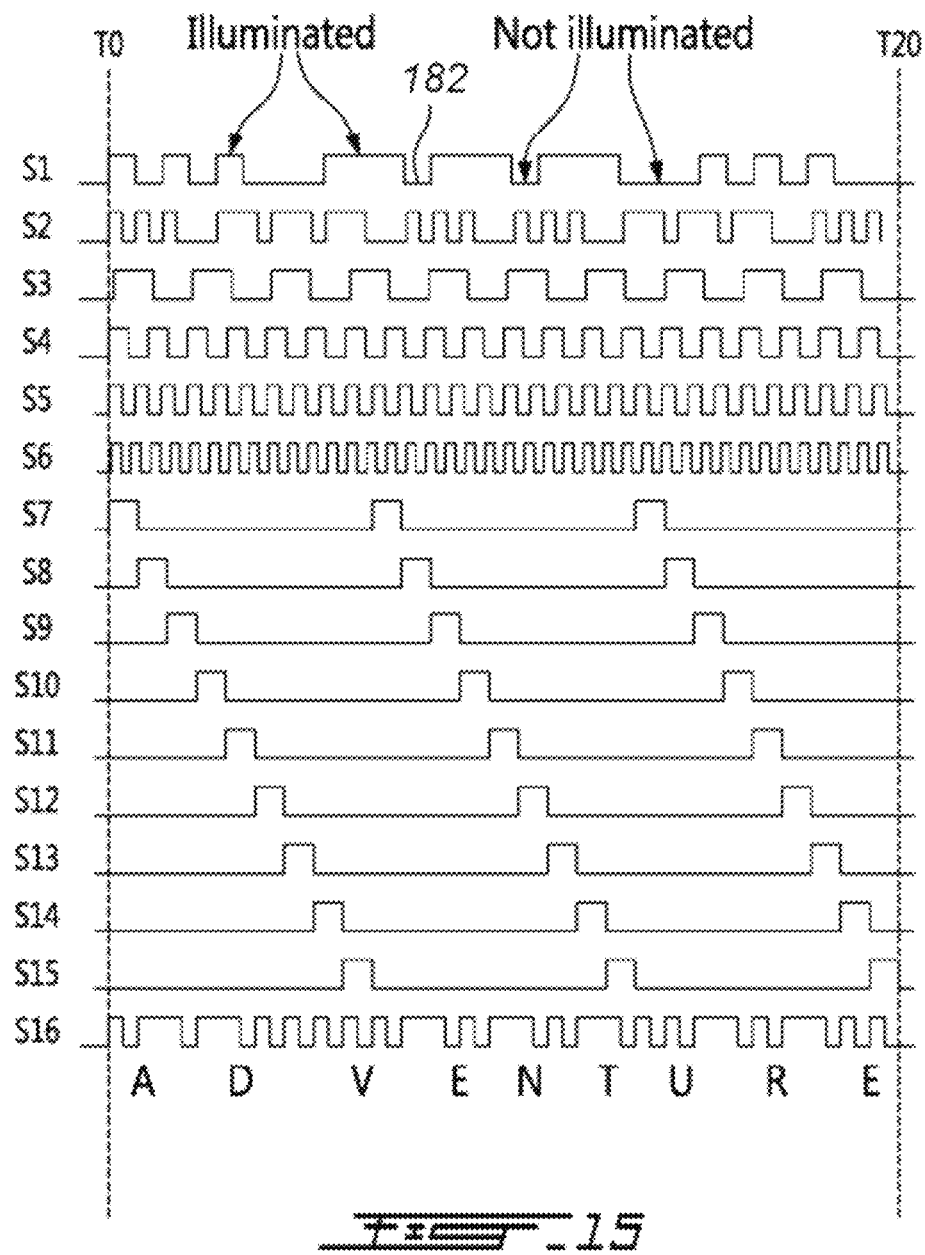

… (1)

SITUATIONAL MARKING AND AWARENESS TAG (SMART) BEACON, SYSTEM AND METHOD

CROSS REFERENCE TO RELATED APPLICATIONS

This application claims priority from U.S. provisional application Ser. No. 61/446,287, filed on Feb. 24, 2011, U.S. provisional application Ser. No. 61/446,290, filed on Feb. 24, 2011 and U.S. provisional application Ser. No. 61/486,967, filed on May 17, 2011 all of which are incorporated herein in its entirety by reference.

FIELD OF THE INVENTION

The present invention relates to a SMART beacon system and method. In particular, the present invention relates to a network of small independent lighting sources which can be operated together in order to provide enhanced lighting effects in a variety of situations.

BACKGROUND TO THE INVENTION

The prior art reveals landing systems and the like comprised of a plurality of lights which flash in preprogrammed sequence to improve visibility and provide direction. One drawback of such prior art systems is that they are fixed, typically interconnected by wires and require significant sources of power in order to operate. In many cases, however, such systems could be advantageously used in places which are difficult to access and without any easy access to power.

Also, in chaotic, fast moving, close tactical operations commanders, operators and team members ideally need to know where the location of other team members. Indeed, during such operations team members typically scatter in order to seek cover and avoid enemy fire. Additionally, the current status of team members and their immediate environment would also need to be known. For example, before starting CASEVAC under fire, company medics ideally need to know the location of friendly casualties.

Prior art methods of indicating status and location typically comprise the use of hand signals, visual location and the use of a voice communications over radios and the like, often combined with the use of GPS location devices. One drawback of such methods is that in many cases they require line of sight which in tactical situations is often not possible, due to dead ground or poor visibility conditions, such as rain, snow or smoke. Another drawback is that such methods might result in a team member inadvertently revealing his position, for example through speaking over a radio or coming out from cover. Still another drawback of such methods is that they require active feedback from the team members, which in the case of an severely injured/unconscious team member is typically not possible.

Another drawback of the prior art devices is that GPS devices often lose tracking signals when used indoors, reducing their effectiveness in tactical operations carried within buildings or the like.

The prior art also reveals light emitting beacons for attaching to people and objects for purposes of identification, avoidance and rescue. These beacons emit light according to predefined signatures, for example according to the ubiquitous SOS signal of three short, three long, three short.

One drawback of such prior art devices, and in particular in cases when a number of individuals are using such devices in proximity to one another, for example in the case of a catastrophe at sea of the like where a plurality of individual life jackets or life rafts are equipped with such light emitting beacons, is that the beacons emit light in an unsynchronized manner. This leads to overall poor visibility which would be greatly increased by synchronizing the light emitting beacons of one individual or boat with that of another such that they emit light simultaneously and according to the same signature.

SUMMARY OF THE INVENTION

In order to address the above and other drawbacks there is disclosed a beacon lighting system comprising: a wireless control channel, a plurality of small independent light sources each comprising a wireless transceiver for communicating via the wireless control channel, an independent power source, at least one LED and a clock synchronized to a common time source, and a master controller for transmitting control data to each of the plurality of small independent light sources via the wireless control channel, wherein when at least a first one of the plurality of small independent light sources is outside a transmission range of the master controller and at least a second one of the plurality of small independent light sources is within range of the master controller and the first one, the second one relays the control data received from the master controller to the first one and further wherein the plurality of small independent light sources subsequently emits light according to the control data and the common time source.

There is also disclosed a beacon tactical system comprising a wireless communication channel, a controller emitting a control signal comprising an indication that the control signal should be relayed, and a plurality of wearable beacons, each of the beacons comprising an independent power source, a transceiver for transmitting and receiving on the wireless communication channel and at least one LED for emitting a preprogrammed sequence of light flashes in response to the control signal transmitted by the controller and received at the transceiver via the wireless communication channel, wherein when at least a first one of the plurality of wearable beacons is outside a transmission range of the controller and at least a second one of the plurality of wearable beacons is within range of the controller and the first one and provided the control signal indicates that it should be relayed, the second one relays the control signal received from the controller to the first one and further wherein the plurality of wearable beacons which have received the control signal subsequently emit light according to the received control signal.

Additionally, there is disclosed a clustered beacon system comprising: a plurality of independent portable light emitting beacons, each of the beacons comprising a light emitting source, an independent power source and a wireless transceiver having a range, wherein when at least one of the beacons is within range of at least one other of the beacons, the in range beacons exchange synchronizing transmissions via their respective transceivers and further wherein each of the in range beacons subsequently emits a sequence of synchronized light flashes in accordance with data contained within the synchronizing transmissions.

BRIEF DESCRIPTION OF THE DRAWINGS

FIG. 1 provides a SMART beacon in accordance with an illustrative embodiment of the present invention;

FIG. 2 provides a schematic diagram of the electronics of a SMART beacon in accordance with an illustrative embodiment of the present invention;

FIG. 4 provides a schematic diagram of a SMART beacon lighting system in accordance with an illustrative embodiment of the present invention;

FIG. 5 provides a schematic diagram of the electronics of a master controller in accordance with an illustrative embodiment of the present invention;

FIG. 6 provides a front plan view of a keypad of a master controller in accordance with an illustrative embodiment of the present invention;

FIG. 9 is a schematic diagram of a SMART beacon tactical system in accordance with an alternative illustrative embodiment of the present invention;

FIG. 14 is a schematic diagram of the electronics of a beacon in accordance with a second alternative illustrative embodiment of the present invention; and FIG. 15 provides timing diagrams for controlling illumination of a beacon in accordance with a second alternative illustrative embodiment of the present invention.

DETAILED DESCRIPTION OF THE ILLUSTRATIVE EMBODIMENTS

Figure 3B:
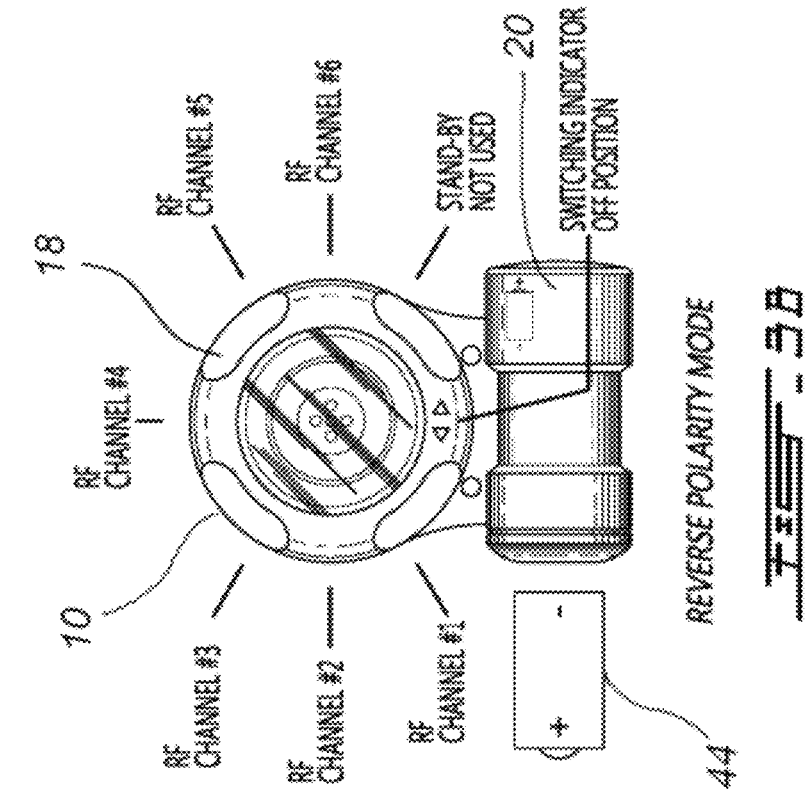
FIGS. 3A and 3B provide diagrams detailing the operation of the battery polarity reversal and rotary switch of a SMART beacon in accordance with an illustrative embodiment of the present invention.

Referring now to FIG. 1, the SMART beacon 10 is a small independent light source comprising at least one LED 12 within a housing 14 and covered by a transparent lens 16. A rotary switch 18 positioned about the lens 16 is provided, whereby through rotation a user can select one of a plurality of modes of operation of the SMART beacon 10, at least one of these modes being an "off" position wherein the SMART beacon 10 does not function. A battery compartment 20 is also provided for housing an independent power source such as a battery (not shown) for powering the one or more LEDs 12. The battery compartment 20 is accessible via a battery compartment cap 22 which may be removed in order to replace the battery. In a particular embodiment the one or more LEDs as in 12 may comprise LEDs of different colours visible to the naked eye, or infra-red or other LEDs visible only with a suitable viewing device.

Referring now to FIG. 2, in a first embodiment the SMART beacon electronics 24 comprise a controller or CPU 26 which provides control signals to an LED driver 28 based on software routines and configuration/control data stored in ROM/RAM 30, user inputs received via the rotary switch 18 and control data received via a wireless transceiver 32 and its associated antenna 34. The LED driver 28 in turn illuminates the one or more LEDs as in 12 according to the control signals, for example according to a predetermined sequence of flashes, selection of LED colour and/or intensity. Illustratively, five (5) LEDs as in 12 are provided, one emitting red light, one emitting blue light, one emitting green light, one emitting white light and one emitting I/R light. Additionally a GPS receiver 36 and GPS antenna 38 is optionally provided in order to provide the location of the SMART beacon 10. Operation of the CPU 26 is synchronized using a onboard clock 40 which can illustratively be synchronized, when available, with clock of the GPS system via the GPS receiver 36. Alternatively, synchronization between SMART beacons as in 10 can be ensured by periodically propagating a common time/system clock between SMART beacons. In this regard, it is unnecessary that all SMART beacons are synchronized to a universal time source, rather what is required is that all SMART beacons that are working in concert to illuminate according to a combined effect are synchronized to a common time source. Illustratively, the onboard clock 40 operates at 32 khz and a system clock of 32 bits accuracy is propagated during message transmission such that good synchronization between SMART beacons can be maintained if a system clock is propagated at least once every three hours. Illustratively, a group of SMART beacons is considered synchronized if the onboard clocks of all SMART beacons of the group are within about 40 milliseconds.

Still referring to FIG. 2, a power circuit 42 comprising a battery 44 and a charge conditioning/rectification circuit 46 is also included in order to provide the requisite power for operating the electronics 24 and powering the one or more LEDs as in 12, for example at various intensities. Additionally, the orientation of the battery 44 in the battery compartment (reference 20 in FIG. 1) is provided as an input to the CPU 26.

Still referring to FIG. 2, it is foreseen that the wireless datalink transceiver 32 and its associated antenna 34 are used to establish and communicate in the 915 MHz band, for example (and as will be discussed in more detail below) with a master controller device or the like whereby the datalink transceiver 32 and its associated antenna 34 is also used to establish and communicate locally via the wireless datalink in the 915 MHz band with other SMART beacons as in 10. In order to address a given SMART beacon as in 10 via the datalink, each SMART beacon 10 is provided with a unique identification, or node ID, for example stored in ROM/RAM 30, or hardwired for example into the datalink transceiver 32. The wireless datalink connection is bidirectional, allowing control signals/control data to be sent to the SMART beacons an in 10, and operational data, such as status or position if available (and as will be discussed in more detail below), to be sent from the individual SMART beacons as in 10 to a master controller.

Referring to FIG. 3 in addition to FIG. 2, as discussed above, the Smart Beacons as in 10 each comprise a rotary switch 18 Illustratively via which the user can select one of a plurality of modes of operation. Additionally, the orientation of the of the battery 44 in the battery compartment 20 can also be used as an input to the mode of operation, thereby effectively doubling the number of modes of operation which can be selected by the rotary switch 18. Illustratively, orientation of the battery 44 in the battery compartment 20 is used to switch of operation between general modes of operation, for example between a first mode of operation where the SMART beacon 10 operates independently and a second mode of operation where the SMART beacon 10 is able to communicate with other SMART beacons as in 10, for example via at least one communications channel dictated by the position of the rotary switch 18. These modes are provided in the table below:

TABLE 1

| Battery Orientation | Rotary Switch | Description |
| --- | --- | --- |
| +First | 0 | Off |
| +First | 1 | Steady Red |
| +First | 2 | Steady Blue |
| +First | 3 | Steady Green |
| +First | 4 | Steady White |
| +First | 5 | Steady I/R |
| +First | 6 | Flashing I/R |
| +First | 7 | Standby/Not Used |
| −First | 0 | Off |
| −First | 1 | Communicate - Channel 1 |
| −First | 2 | Communicate - Channel 2 |
| −First | 3 | Communicate - Channel 3 |
| −First | 4 | Communicate - Channel 4 |
| −First | 5 | Communicate - Channel 5 |
| −First | 6 | Communicate - Channel 6 |
| −First | 7 | Standby/Not Used |

Referring now to FIG. 4, a SMART beacon lighting system, general referred to using the reference numeral 48, will now be described. The system 48 is comprised of a mesh network of small independent light sources such as in 10, such as the self powered SMART beacon 10, interconnected with other proximate SMART beacons as in 10 via a wireless control channel (datalink) as in 50. In this regard, and in order to reduce power consumed for communications, the range of the SMART beacons as in 10 is limited (for example a nominal range of about or less than 500 feet when the beacon 12 is positioned on the ground is foreseen) whereby, and as will be discussed in more detail below, each of the SMART beacons as in 10 comprises the necessary transceiver functions in order to function as a repeater, thereby allowing messages transmitted to a given SMART beacon as in 10 to be relayed by another SMART beacon as in 10 if this is so indicated. Again, the datalink illustratively operates in the 915 MHz band at a rate of 128 kbits/sec.

Note that, in a particular embodiment, the particular message transmitted by the master controller 52 may include an indication that it is not to be relayed to other SMART beacons as in 10. This is useful, for example, to limit the propagation of messages to SMART beacons as in 10 which are only within direct contact with the master controller 52. For example, in a particular embodiment the message may include control data to the effect that all SMART beacons as in 10 receiving the message switch for a short period of time from infrared to visual light and flash quickly with a high intensity, allowing only those SMART beacons as in 10 in the neighborhood of the master controller 52 to be quickly visually identified (for example when a squad commander in a battlefield situation wishes to quickly visually locate proximate members of his squad). A large variety of alternative uses of this feature should now be apparent to a person of ordinary skill in the art.

Still referring to FIG. 4, each transmission between the master controller 52 and a SMART beacon 10 and between SMART beacons when a message is being relayed, illustratively includes a time stamp which can be used to synchronize the onboard clock 40 to the system clock if other synchronization means, such as a GPS receiver or the like, are unavailable. In this regard, on receiving a message including a time stamp the SMART beacon 10 illustratively compares the time stamp with a current time of the onboard clock 40, taking into account any inherent and known delays in receiving and processing the time stamp. In the event that the time stamp is fresher than the onboard clock 40, the onboard clock 40 is updated.

Still referring to FIG. 4, when acting as a repeater, each SMART beacon 10 propagates received messages to a small number of other SMART beacons, illustratively a maximum of five (5), that are within range. As many SMART beacons as in 10 may be transmitting within the same band, a collision avoidance strategy illustratively comprised of randomly selecting a delay before retransmitting is provided. A list of the node IDs of the (illustratively five) SMART beacons that are within range and to whom messages are being broadcast is maintained within each SMART beacon. Following broadcast, if the SMART beacon fails to receive the same message (each message is provided a unique message ID) in return from one of the SMART beacons found within the list, the message is rebroadcast.

Still referring to FIG. 4, as discussed briefly above, the SMART beacon lighting system 48 is further comprised of a master controller 52 which can be used to control the plurality of SMART beacons as in 10 via a wireless control channel (datalink) 54. Illustratively, the master controller 52 would typically have a range greater than that of the SMART beacons 10, nominally this range would be about or less than 3 miles, and would be in the form of a key fob or the like (not shown). In an alternative embodiment the master controller 52 can act as a bridge or relay in order, for example, to relay control data from an external controller 56 on board an aircraft or the like via an appropriate wireless link 58, for example in order to receive remote instructions to illuminate or extinguish the SMART beacons as in 10. Alternatively, the external controller 20 could be a suitably equipped PDA or Smart Phone of the like which communicates with the master controller 52 via a Bluetooth connection, USB connection or the like.

Referring back to FIG. 3 in addition to FIG. 4, in a networked mode the SMART beacon 10 would illustratively act under control of the master controller 52. Additionally, as discussed above provision has been made such that each SMART beacon 10 can be addressed individually via their node ID or as a group via a group (or subnetwork) ID. In this regard the node ID is typically static while the group ID can be modified for example by using the master controller 52. In one example embodiment the master controller 52 is able to modify the group ID of all SMART beacons 10 which are enabled (i.e. turned on) and within range. Subsequent to such modification, all such modified SMART beacons 10 can be addressed individually via the node ID or collectively via the group ID allowing them all to be, for example, turned off or on using a single command. The group ID also provides that changes in programming of one of the SMART beacons in a particular group is propagated to all the SMART beacons in that group. This is useful, for example, when the signature to be emitted by the SMART beacons is to be modified, there is a requirement that all SMART beacons in the network emit that signature, for example to identify members of a group or unit or the like.

Referring now to FIG. 4 and FIG. 5 the master controller 52 is comprised of a controller or CPU 60 which, using software routines and configuration data stored in ROM/RAM 62, user inputs received via the keypad 64 and potentially other control data received from external devices by a USB interface 66, a Bluetooth™ interface 68 and its associated antenna 70 or Wifi interface 72 and its associated antenna 74, generates control signals for transfer to one or more SMART beacons as in 10 via the wireless datalink transceiver 76 and its associated antenna 78. The master controller 52 is also able to receive operational data, such as an identification of a particular SMART beacon as in 10 and its position via the datalink transceiver 76 and its associated antenna 78. Illustratively, a battery (not shown) provides the requisite power in order to ensure correct operation of the electronics.

Referring now to FIG. 6 in addition to FIG. 1, the keypad 64 provides an interface via which a user can remotely control a plurality of SMART beacons as in 10. The keypad 64 comprises:
- a power switch 80 and power LED 82 which illuminates when the master controller is operational;
- an intensity setting display 84 with associated set button 86;
- a selected channel/group display 88 with associated set button 90;
- a plurality of buttons as in 92 for selecting one of the available colours (red, blue, green, white or I/R);
- a steady mode select button 94;
- a flashing mode select button 96;
- a pair of channel/group select buttons 98, 100; and
- an "all off" select button 102.

Referring to FIG. 3B in addition to FIG. 5 and FIG. 6, and with reference to Table 1 above, in operation, one or more first SMART beacons as in 10 are placed in the networked mode by reversing the battery 44 and then a given channel, for example channel 1, is selected for all of the first SMART beacons as in 10 using their rotary switches 18. This same procedure may be repeated with other groups of SMART beacons as in 10 while selecting a different channel number. Once the SMART beacons as in 10 are placed in the networked mode and a given channel selected, the key pad 64 may be used to select and control all networked SMART beacons as in 10 operating on a particular channel. In this regard, and as will now be clear to a person of ordinary skill in the art, all SMART beacons as in 10 for a given channel may be controlled to emit light of a given colour (red, green, blue, white and I/R), at a given intensity and in steady mode or flashing mode. Additionally, SMART beacons as in 10 networked on a first channel may be controlled to emit light of a given colour, intensity and mode which is different or the same as that of SMART beacons as in 10 networked on a second channel.

Referring to FIG. 4 and FIG. 5, as discussed above in a particular embodiment the master controller 52 is able to communicate with suitably equipped external device 56, such as PDAs, Smart Phones, PCs and the like via one of a possible plurality of interfaces such as Bluetooth™ 68, USB 66, or WIFI 72.

Figure 7:
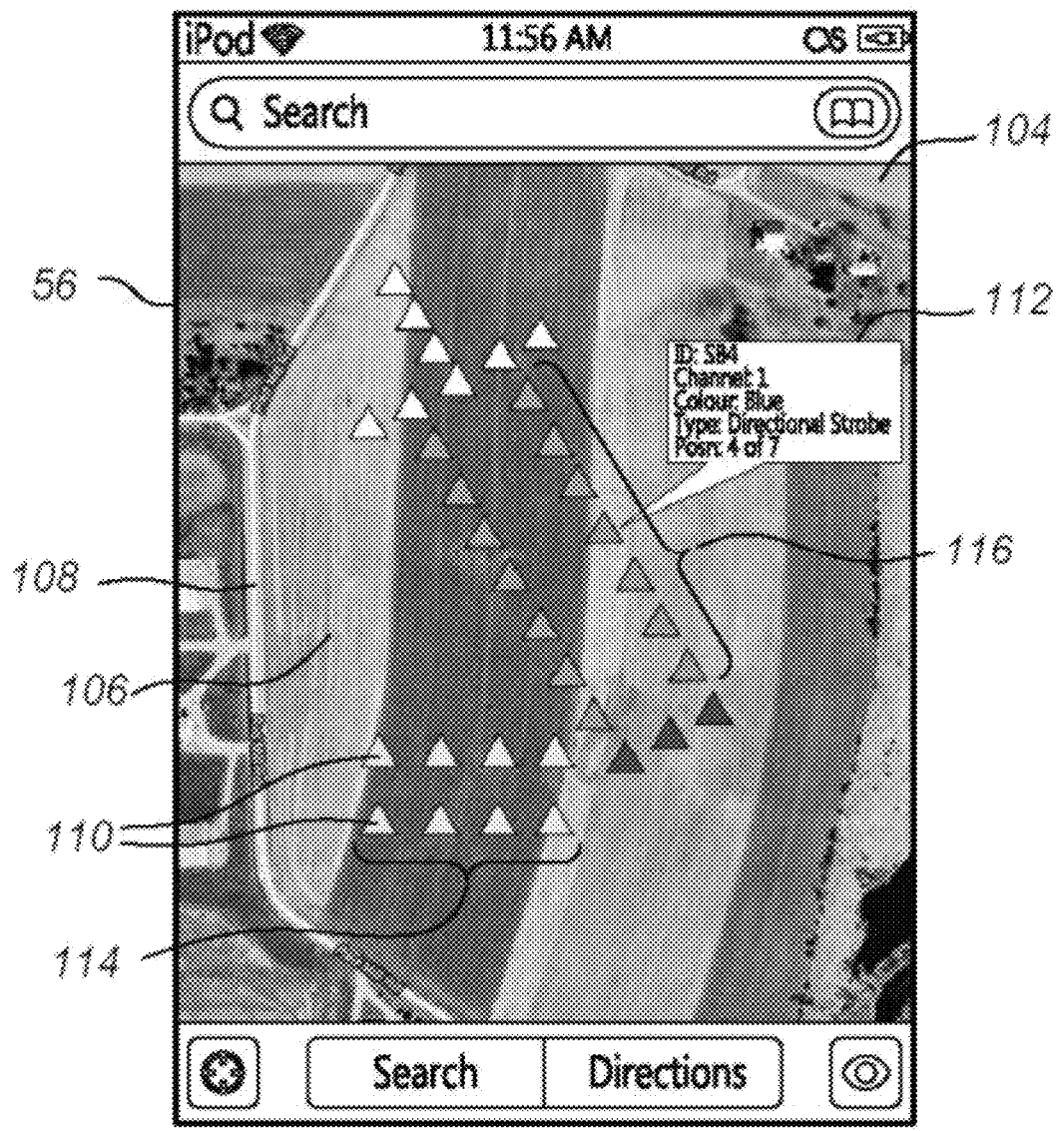
FIG. 7 provides a front plan view of an external device for viewing and controlling a plurality of SMART beacons in accordance with an illustrative embodiment of the present invention.

Referring to FIG. 2 and FIG. 7, the external device 56 is equipped with a touch screen display 104 which can be used for displaying, for example, images of terrain 106 and roads 108 and the like. As each SMART Beacon as in 10 is equipped with a GPS receiver 36 and is individually addressable via unique identifier, the GPS position of each SMART beacon as in 10 associated with the master controller as in 56 is capable of being displayed as an icon 110 or the like on the a display 104 of the external device 56. Additional data, such as the ID of a given SMART beacon, its channel, colour and mode can also be displayed in an appropriate display box 112 displayed adjacent the SMART beacon as in 10, for example when the user taps its associated icon 110 with his finger.

Still referring to FIG. 2 and FIG. 7, in a particular embodiment the SMART beacons as in 10 are illustratively organized into groups as in 114, 116 based, for example, on their channel number or group ID. Also in a particular embodiment, the unique node ID identifier also provides the ability to individually address each of the SMART beacons as in 10 in order to provide particular effects. For example, in a particular embodiment the SMART beacons as in 10 of a group as in 114 may be controlled to provide a directional strobe, or "rabbit ear", effect, for example in order to provide a pilot visual indications as the direction of approach to a runway or the like. As once placed in operational mode the SMART beacons as in 10 function independently, in order to ensure that the SMART beacons as in 10 of a group remain synchronized, the high precision clock available from the GPS receiver 36 can be taken advantage of.

In this regard, and referring to FIGS. 8A to 8D, in an embodiment the timing of all flashing or strobe illumination effects are determined according to a timing diagram stored within the ROM/RAM 30 which provides the start time $T_S$ and duration $T_D$ of a particular illumination effect following reset. The reset is carried out continuously and simultaneously following expiration of a predetermined timeout $\Delta T$ in the SMART beacons as in 10. Illustratively, the same reset time (e.g. every 20 seconds such that a reset falls on the hour) is used. Illustratively, $\Delta T$ is 20 seconds which is of sufficient duration to allow many different and complicated illumination effects to be described, but of limited enough direction to ensure that synchronization is not lost.

In an alternative embodiment of the timing diagram, the master controller 52 transmits control data to a given node ID or group ID including in a message body a coded description of the signature, or lighting effect, to be emitted by the addressed SMART beacons once activated. Illustratively, any one of the timing diagrams illustrated in FIGS. 8A to 8D could form the basis of the message body to be transmitted in this fashion. A typical format would include a sequence of relative delays (starting from time 0) before a given LED is turned on or off, and could include other data as well such as the intensity of illumination and the like. A duration $\Delta T$ could also be included to indicate when the sequence should restart. In this regard, by applying a function to the synchronized onboard clock mod $\Delta T$, such that the output is reset to zero following each $\Delta T$, a common starting point of the illumination sequence for all SMART beacons can be achieved, thereby providing the system the ability to produce a variety of synchronized and complex illumination effects.

Figure 8A:
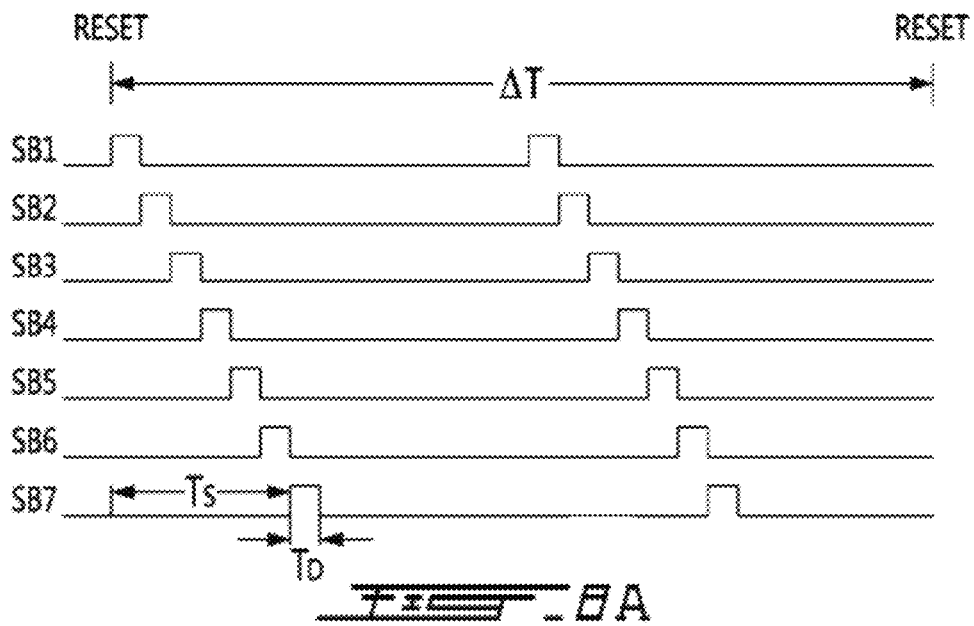
FIGS. 8A through 8D provide timing diagrams for controlling illumination of a SMART beacon in accordance with an illustrative embodiment of the present invention.
Figure 8B:
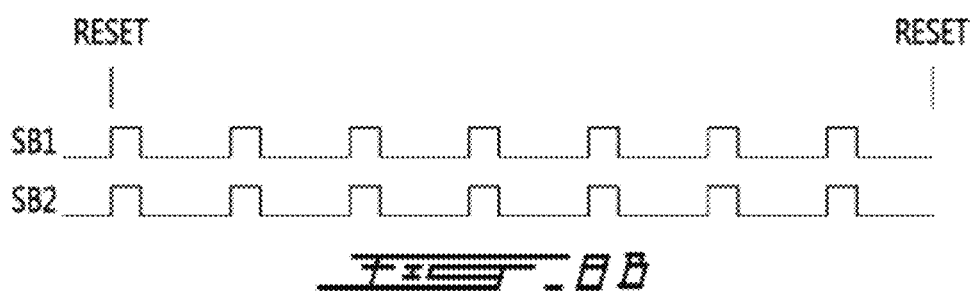
Figure 8C:
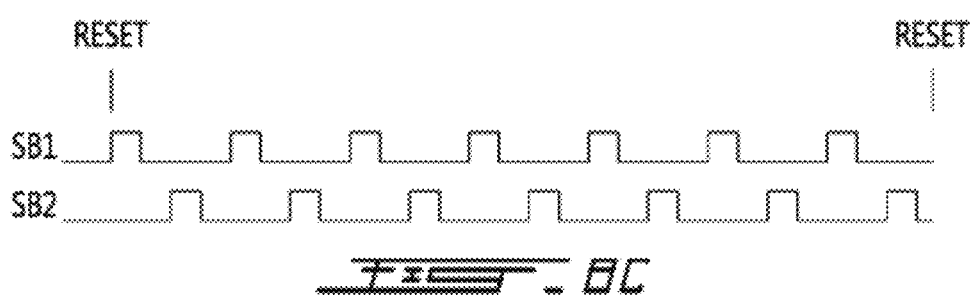
Figure 8D:

Referring now to FIG. 8A in addition to FIG. 7, a timing diagram is provided in order to illustrate the operation of the SMART beacon's directional strobe. In operation the group of SMART beacons 114 which are to provide the directional strobe effect are first positioned on the ground and then, using the external device 102, the start time $T_S$ of the strobe relative to the other SMART beacons as in 10 in the group 114 configured such that it is later than the previous SMART beacons as in 10 in the direction it is wished to indicate using the directional strobe. Illustratively this would be done by selecting the effect (e.g. Directional Strobe) as well as the position (e.g. 4 of 7) of the SMART beacon within the sequential ("rabbit ear") strobe effect. Using the unique ID, a control signal would then be sent to the SMART beacon in question via the master controller 52.

Referring now to FIG. 9, a SMART beacon tactical system, generally referred to using the reference numeral 118, and in accordance with an alternative illustrative embodiment of the present invention will be described. The system 118 is comprised of a mesh network of small independent self powered SMART beacons as in 10 interconnected with other proximate SMART beacons as in 10 via a datalink as in 50. As discussed above, in order to reduce power consumed for communications, the range of the SMART beacons as in 10 is limited whereby each of the SMART beacons as in 10 comprises the necessary transceiver functions in order to function as a repeater, thereby allowing transmissions addressed to a given SMART beacon as in 10 to be relayed by another SMART beacon as in 10. Illustratively, the datalink operates in the 915 MHz band and is of relatively low power. It is foreseen that each SMART beacon used in the context of the a SMART beacon tactical system 118 has a nominal range of about 150 feet when attached to a user's upper body. In order to increase range, an additional higher power repeater unit (not shown) could be used, for example attached to the shoulder or helmet of the user.

Still referring to FIG. 9, each of the plurality of SMART beacons as in 10 is typically worn by a user (not shown) and in a particular embodiment is able to communicate with a variety of physiological sensors as in 120 also worn by the user via a low power Wireless Personal Area Network (WPAN) 122 such as Bluetooth, inductive coupling network, or the like. Via the WPAN 122, the SMART beacons as in 10 are also able to communicate with external computing devices 124 such as personal computers, smart phones and the like. The one or more of the Smart beacons as in 10 may also be equipped to communicate with additional external computing devices 126 using a medium or longer range communication link 128 such as WiFi Hotspot 130 in the 2.4 GHz band or the like and associated network infrastructure 132.

Figure 10:
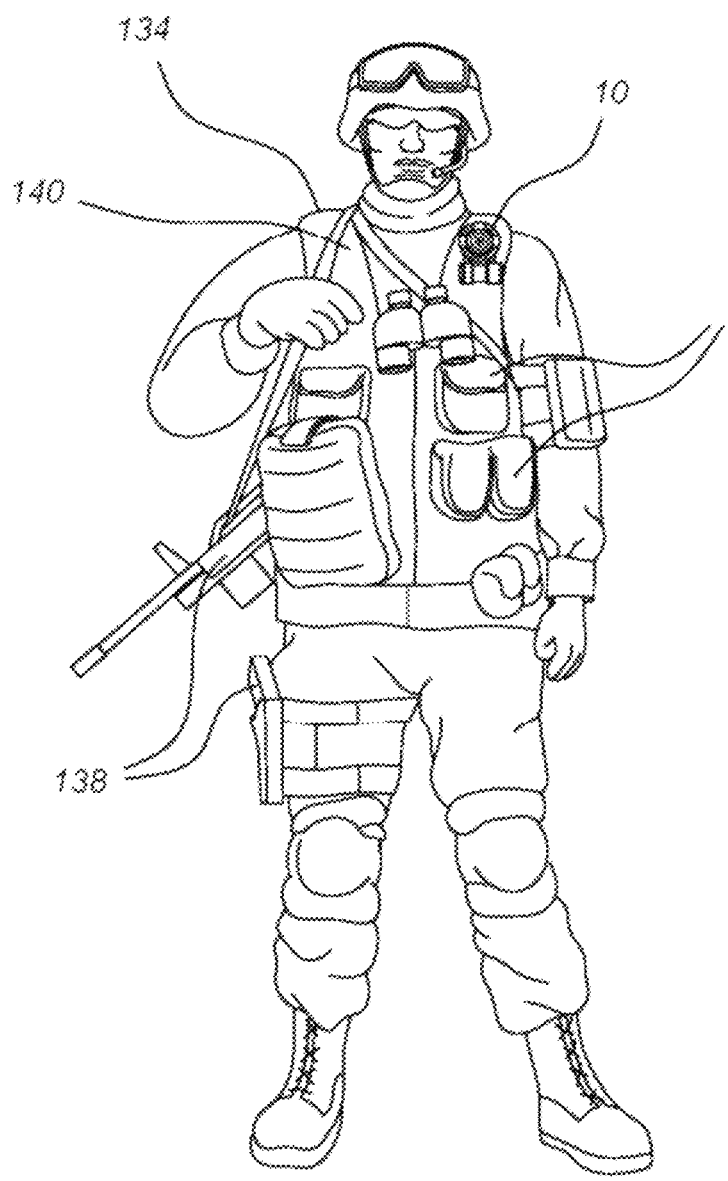
FIG. 10 is front view of a user wearing a SMART beacon in accordance with an illustrative embodiment of the present invention.

Referring now to FIG. 10, as discussed above, a user 134, such as a soldier or tactical police officer or the like, is typically equipped with one or more SMART beacons 10 and other equipment such weapons 138 and body armour 140. Illustratively, the one or more physiological sensors (reference 120 in FIG. 9) are integrated into the body armour 140 or helmet, which, as discussed communicate with the SMART beacon 10 via the WPAN (reference 122 in FIG. 9). The physiological sensors 120 could illustratively be of the type which sense vital signs such as heart rate, body temperature, surface conductivity, accelerometers for sensing stressors such as impact or concussive blows, and the like.

Figure 11:
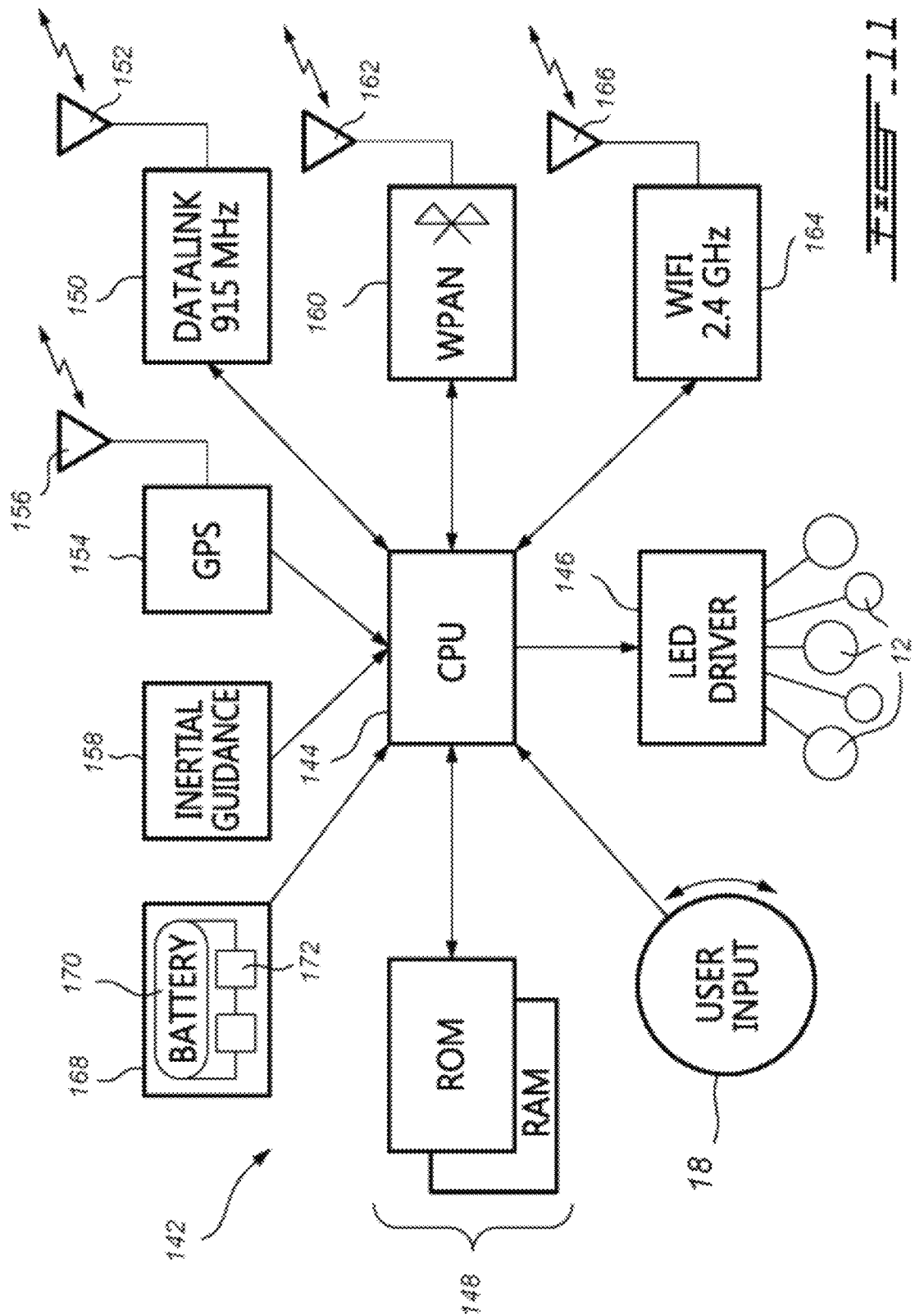
FIG. 11 is a schematic diagram the electronics of a SMART beacon in accordance with an alternative illustrative embodiment of the present invention.

Referring now to FIG. 11, in the alternative embodiment, the SMART beacon electronics 142 comprise a controller or CPU 144 which provides control signals to an LED driver 146 based on software routines and configuration data stored in ROM/RAM 148, user inputs received via the rotary switch 18 and control data received primarily via the datalink transceiver 150 and its associated antenna 152. The LED driver 146 in turn illuminates the one or more LEDs as in 12 according to the control signals, for example according to a predetermined sequence of flashes, selection of LED colour and/or intensity. Illustratively, five (5) LEDs as in 12 are provided, one emitting red light, one emitting blue light, one emitting green light, one emitting white light and one emitting I/R light. Additionally, or alternatively, a thermal emitter could be incorporated to provide thermal signaling.

Still referring to FIG. 11, a GPS receiver 154 and GPS antenna 156 are provided in order to provide the location of the SMART beacon 10 as well as a universal time source. In a particular embodiment an integrated inertial guidance system 158, comprising accelerometers and the like (not shown), can be included in order to provide the SMART beacon's 10 location in environments where the GPS signals are interfered with, such as in urban areas, indoors or the like. The accelerometers of the integrated inertial guidance system 158 can also be used to sense shock waves such as those resulting from explosive blasts, collisions and the like.

Still referring to FIG. 11, additional interfaces may include a WPAN interface such as a Bluetooth interface 160 and associated antenna 162 operating in the 2.4 GHz band as well as a Broadband interface such as a WiFi interface 164 and associated antenna 166 operating in the 2.4 GHz band. A power circuit 168 comprising a battery 170 and a charge conditioning/rectification circuit 172 is also provided in order to supply the requisite power for operating the electronics 142 and powering the one or more LEDs as in 12, for example at various intensities. Additionally, the orientation of the battery 170 in the battery compartment (reference 20 in FIG. 1) is provided as an input to the CPU 144.

Still referring to FIG. 11, it is foreseen that the datalink transceiver 150 and its associated antenna 152 are used to establish and communicate in the 915 MHz band via the datalink connection (reference 50 in FIG. 9) with other SMART beacons as in 10. In order to address a given SMART beacon as in 10 via the datalink 50, each SMART beacon 10 is provided with a unique identification, for example stored in ROM/RAM 148, or hardwired for example into the datalink transceiver 150. In this regard, the SMART beacons, via the datalink transceiver 150 and its associated antenna 152, are able to communicate with other SMART beacons as in 10 which are not directly within range via other intermediary SMART beacons as in 10. As the SMART beacons as in 10 are typically foreseen for use in a dispersed group setting in a generally localized area, this allows the transmission power of any particular transmission to be minimized, which has the dual benefit of saving power and limiting discovery, while allowing for communications to reach SMART beacons as in 10 which otherwise would not be within each others range.

Figure 3A:
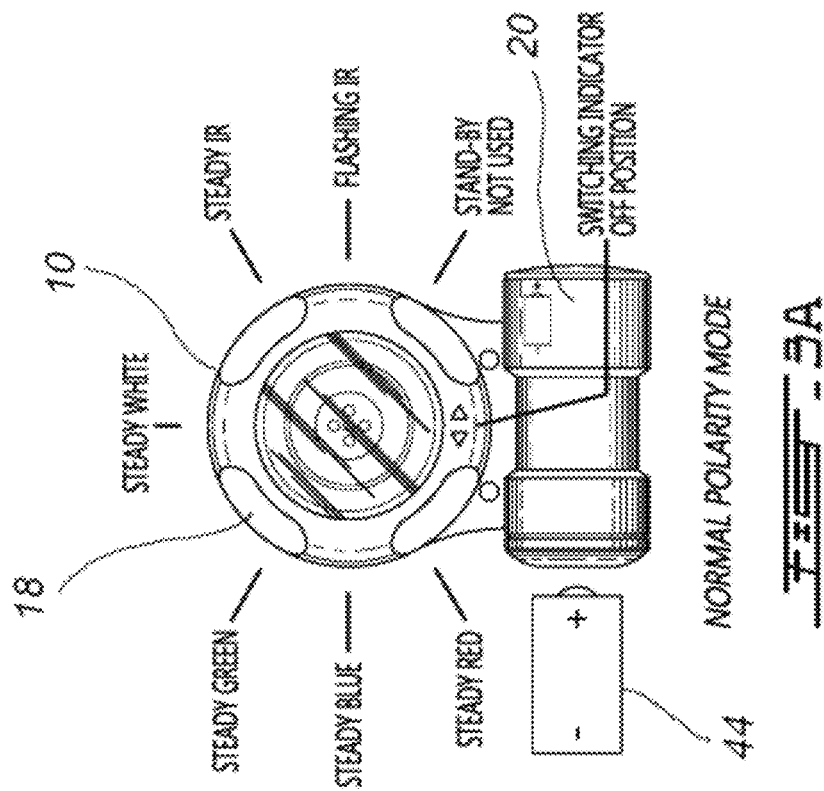

In the alternative embodiment herein described, the modes of operation and channel selection of the SMART beacon 10 is substantially the same as that discussed hereinabove with reference to FIGS. 3A and 3B and TABLE 1. Additionally, in the transmission mode the SMART beacon 10 is able, for example, to transmit its current position and other data collected via the one or more physiological sensors (reference 120 in FIG. 9) to other SMART beacons as in 10.

Figure 12:
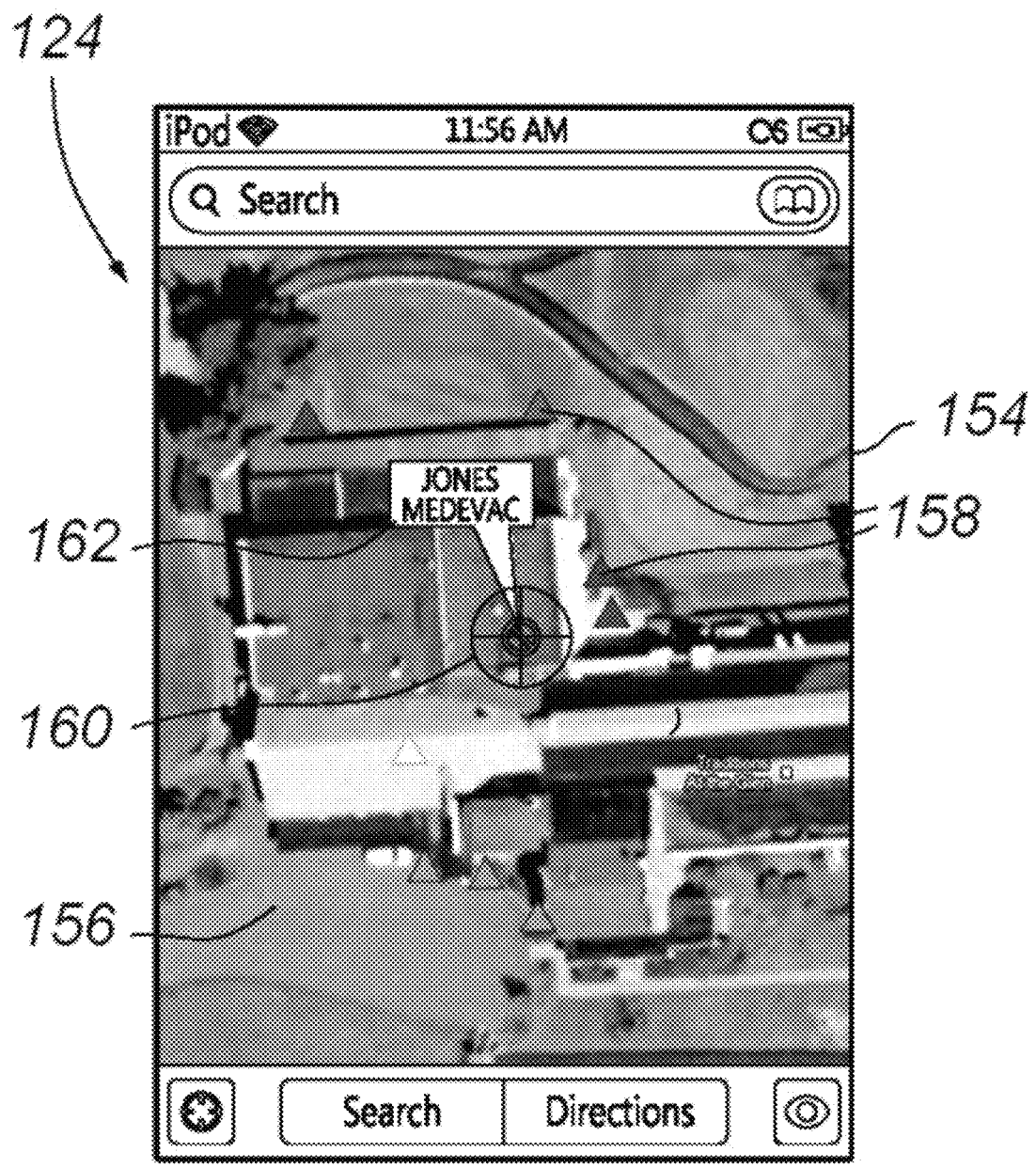
FIG. 12 is a front plan view of a display screen of an external device for viewing and controlling a plurality of SMART beacons in accordance with an illustrative embodiment of the present invention.

Referring back to FIG. 9, as discussed above a personal computer, smart phone or the like 124 may be tethered to a particular SMART beacon 10 using the WPAN 122, thereby allowing data transmitted between the various SMART beacons as in 10 to be received by the smart phone 124 for additional processing. Referring now to FIG. 12, an exemplary smart phone 124 is illustratively equipped with a display 154 and software for displaying a map 156 onto which icons as in 158 representing the position of the SMART beacons are displayed. Movement of the cursor 160 over one of the icons is illustratively used as a command to provide detailed information 162 associated with that particular icon/SMART beacon. Additionally, the shape, color and behavior of the icon could be selected to coordinate with the particular status of the icon. For example, if data collected from the one or more physiological sensors (reference 120 in FIG. 9) indicate that the wearer of the SMART beacon is in distress, then the behavior icon (for example a color change or placed in a flashing mode) as displayed on the display 154 could be changed to provide a visual cue to this effect. Additionally, GPS and inertial guidance data can be used be processed in order to derive a direction of movement or the like.

Still referring to FIG. 12, in an additional scenario the color of the icons as in 158 as well as their behavior can be coordinated with the actual color and behavior of the particular SMART beacons they represent. For example, a red flashing SMART beacon can be displayed as a red flashing icon 158 on the display 154. This can be based either on data received from the SMART beacon indicating its current mode of operation, or control data sent from the smart phone to the SMART beacon based on inputs or configurations selected by the user of the smart phone. The smart phone could also be used to selectively or globally change the color and behavior of each or all the SMART beacons simultaneously.

Figure 13:
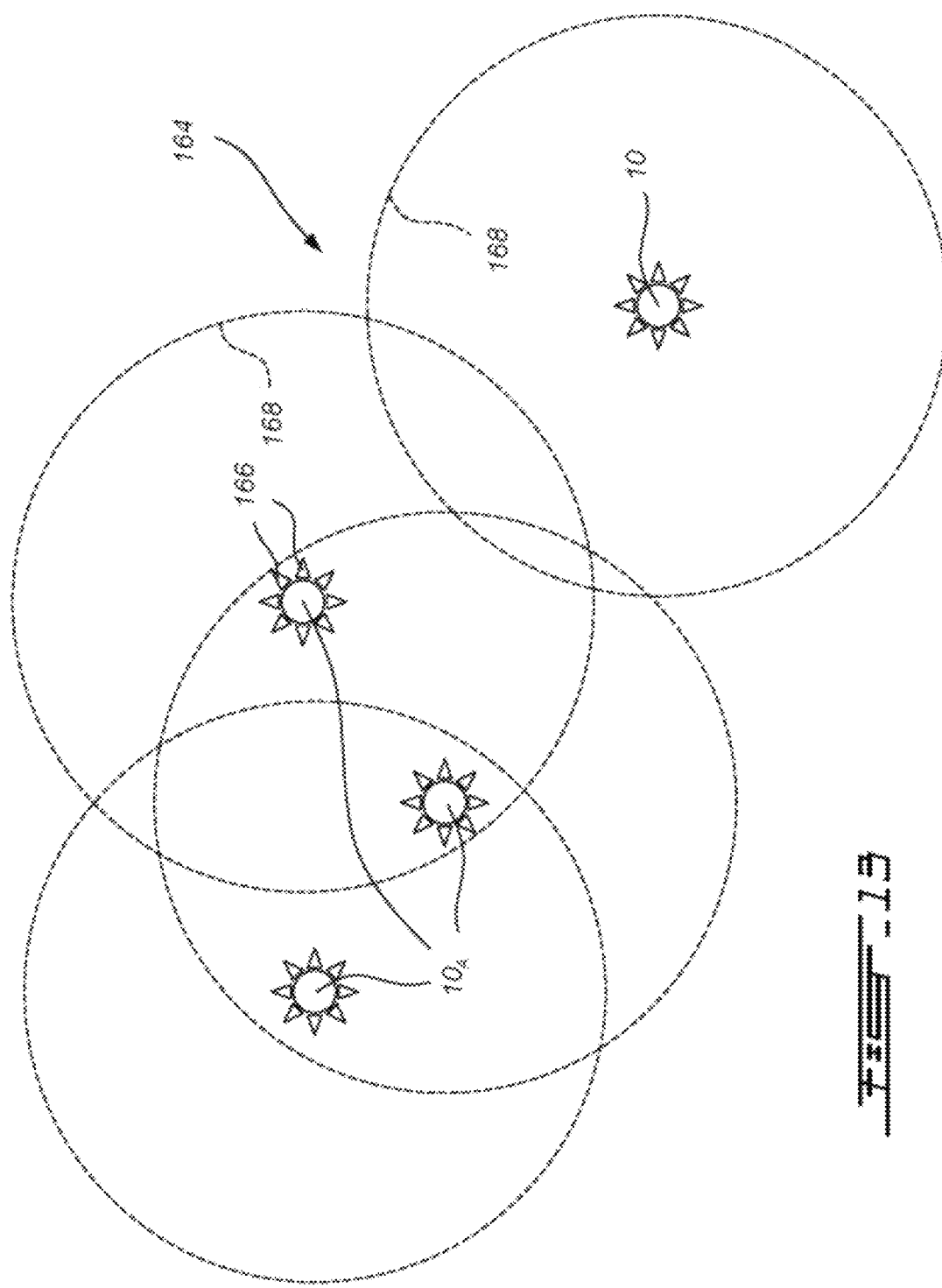
FIG. 13 is a schematic diagram of a clustered beacon system in accordance with a second alternative illustrative embodiment of the present invention.

Referring now to FIG. 13, a clustered beacon system, general referred to using the reference numeral 164, and in accordance with a second alternative illustrative embodiment of the present invention will be described. The system 164 comprises a plurality of portable beacons 10, for example attached to a life jacket or the like (not shown), which upon activation emit light flashes 166 according to a predetermined signature. Each of the beacons 10 further comprises a range 166 within which it is able to communicate and exchange data with another of the beacons as in 10. In accordance with one illustrative embodiment of the present invention, beacons as in $10_A$ which are within range of one another communicate and exchange data such that they emit light flashes 166 which are synchronized with one another, and typically according to the same signature.

Still referring to FIG. 13, for example in an illustrative embodiment the beacons 10 are attached to life jackets worn by individuals and activated once the individual enters the water. In this regard, and referring back to FIG. 1, the beacon 10 is illustratively equipped with a water activated switch 168 such that the at least one LED 12 commences emitting light according to a predetermined or selected signature automatically once water is entered.

Referring now to FIG. 14, illustratively the electronics of the second alternative illustrative embodiment of the beacon 10 comprise a controller (CPU) 170 as well as ROM/RAM 172 for storing software programs and data and the like. The controller 170 receives inputs via the rotary switch 18, the water activated switch 168 and the transceiver 174 and, according to data stored within the ROM/RAM 172, drives the one or more LEDs 12 via an LED driver interface 176. A system clock 178 is provided in order to ensure correct timing of the electronics. In particular, the transceiver 174 is used to exchange, using an appropriate communications protocol, synchronization data.

Still referring to FIG. 14, in a particular embodiment a GPS module 180 is provided in order to determine the location of the light emitting beacon 10 as well as provide a universal time signal, which, as will be discussed in more detail below, is illustratively used by the system clock 178 in order to maintain a universal synchronization. Additionally, in a particular embodiment, the transceiver 174 can be a wireless RF transceiver using WiFi, Bluetooth or the like. Additionally, the wireless RF transceiver could include the ability to build adhoc or mesh networks with other beacons within range such that beacons within range of other "out of range" beacons can be used as a communication relay to reach those beacons. Alternatively, the transceiver 174 could be a line-of-sight wireless transceiver such as an infrared transceiver or the like.

Referring now to FIG. 15 in addition to FIG. 14, each beacon 10 illustratively comprises control data stored in ROM/RAM 172 for illuminating the one or more LEDs 12 according a plurality of signatures as in 182. Each signature as in 182 comprises periods of time during which a particular LED as 12 is illuminated or is not illuminated (as indicated in FIG. 15 in reference to signature $S_3$) over a predetermined time interval, illustratively twenty (20) seconds. Following the expiration of the given time period, the sequence merely repeats in order to generate an indicated signature over an extended period of time. Illustratively sixteen (S1 through S16) signatures are provided.

A signature comprises not only the relative position and length of the periods within which the one or more LEDs as in 12 are illuminated, but also, through repetitions, the frequency at which the particular sequence is played. For example the well known SOS Morse code can be played at a first frequency by selecting S1 and a faster frequency (twice as fast) by selecting S2. Alternatively, referring to S3, S4, S5 and S6 it may be wished to have an equally spaced sequence of flashes played at different frequencies, for example 0.5 Hz (S3), 1 Hz (S4), 2 Hz (S5), 4 Hz (S6) and so on. In order to accommodate each of these a separate signature is required. In still another embodiment, and referring to S7 through S15 it may be wished that a plurality of synchronized beacons as in 10 illuminate at different periods in time, for example in order to provide a moving strobe effect, such as used in airport runways and the like, and for example in order to indicate direction. Additionally, and referring to S16, other more general sequences can be preprogrammed and subsequently selected in order to provide a wanted effect.

Still referring to FIG. 14 and FIG. 15, in operation the starting time of any signature is controlled according to the system clock 178 as well as synchronization data received at a given beacon 10 from other beacons as in 10 within range via the transceiver 174 using an appropriate communications protocol. Synchronization data could include, for example, a point in time when all beacons as in 10 within range should commence illumination, signature to be used, position data and the like. Illustratively, the GPS module 180 can be used to provide ongoing updates to the system clock 178 in order to ensure that the system clocks 178 of all the beacons as in 10 remain synchronized with one another.

As discussed above, the predetermined time interval after which a signature is repeated is illustratively 20 seconds. In practice, the predetermined time interval is typically selected long enough such that a number of different signatures can be easily accommodated within the time period, yet short enough such that differences in the speed of the system clocks 178 of different beacons 10 has little or no effect. Provided each of the beacons as in 10 are synchronized to restart a particular signature at substantially the same moment of time, the entire group of beacons will maintain synchronization and appear, for example, to flash as one to give the effect of one large single light source.

In a particular embodiment, beacons as in 10 could initially illuminate according to a predetermined signature at a random starting point in time. As subsequent beacons as in 10 come into range they would be resynchronized such that the signature is commenced at the same time, thereby providing a visual clue that a given beacon as in 10 is within range of another beacons or group of beacons.

While this invention has been described with reference to the illustrative embodiments, this description is not intended to be construed to a limiting sense. Various modifications or combinations of the illustrative embodiment of the invention will be apparent to persons skilled in the art upon reference to the description. It is therefore intended that the described invention encompass any such modifications or embodiments.

The invention claimed is:

1. A beacon lighting system comprising:
a plurality of small portable independent light sources each comprising a wireless transceiver for sending and receiving data via a wireless radio frequency control channel, an independent power source, at least one LED, a clock synchronized to a common time source and a plurality of common predefined timing diagrams each of a predetermined time length ΔT stored in memory and wherein in operation a selected timing diagram is reset after expiry of said predetermined time length ΔT and according to said common time source; and a master controller for transmitting control and clock synchronization data to each of said plurality of small independent light sources via said wireless radio frequency control channel, said control data comprising a reference to a respective one of said timing diagrams;

wherein when at least a first light of said plurality of small independent light sources is outside a transmission range of said master controller and at least a second light of said plurality of small independent light sources is within range of said master controller and said first light, said second light relays said control and clock synchronization data received from said master controller to said first light for synchronizing their respective clocks with said clock synchronization data and further wherein a first group of said plurality of lights subsequently emits light flashes according to first control data to achieve a first effect in synchronization with a second group of said plurality of lights which subsequently emits light flashes according to second control data and said common time source to achieve a second effect different from said first effect, and wherein said synchronization is independent of light flashes emitted by any of said plurality of light sources.

2. The system of claim 1, wherein said control data comprises a command to each of said plurality of small independent light sources to halt illuminating said at least one LED according to said respective timing diagram and a command to each of said plurality of small independent light sources to commence illuminating said at least one LED according to said respective timing diagram.

3. The system of claim 1, further comprising a plurality of wireless control channels, wherein said master controller and each of said plurality of small independent light sources comprises a switch for selecting one of said wireless control channels and further wherein said control data is transmitted via a selected one of said plurality of wireless control channels.

4. The system of claim 3, wherein said master controller is able to transmit simultaneously on all said plurality of wireless control channels.

5. The system of claim 1, wherein each of said small independent light sources comprises a plurality of LEDs and further wherein each of said plurality of LEDs emits one of red, green, blue and white light and infrared.

6. The system of claim 1, wherein each of said small independent light sources comprises a GPS receiver outputting a GPS clock signal as said common time source.

7. The system of claim 1, wherein each wireless transceiver has an operational range of less than 500 feet when said small independent light sources are on the ground.

8. The system of claim 1, wherein said control data includes a command to not retransmit said control data.

9. The system of claim 1, wherein said first effect is a directional strobe (follow me) effect.

10. The system of claim 9, wherein each of said light sources emits infrared light.

\* \* \* \* \*